United States Patent Office 3,301,795
Patented Jan. 31, 1967

3,301,795
SELF-CATALYZING EPOXY RESIN COMPOSITIONS, IMPROVED POLYCARBOXYLIC ACID ANHYDRIDE CURING AGENT THEREFOR AND PROCESS FOR PREPARING THEM
George S. Wooster, Hamburg, N.Y., assignor to Allied Chemical Corporation, New York, N.Y., a corporation of New York
No Drawing. Filed Aug. 9, 1961, Ser. No. 130,243
9 Claims. (Cl. 260—2)

This invention relates to an improved epoxy resin curing composition, to a process for preparing it, to improved epoxy resin compositions prepared therefrom and to a process for curing epoxy resins.

Epoxy resins, by virtue of their excellent combination of physical, chemical and electrical properties are used in many industrial applications. For example, epoxies are consumed in large volume in such fields as coatings, molding and encapsulation compounds, binders for laminates, adhesives and electrical insulators. In many of these aplications, the resulting products are subjected during use of elevated temperatures and it is now known to improve the heat stability of the epoxy resins by copolymerizing them with a polycarboxylic acid anhydride as a curing agent.

The acid anhydride curing agent is believed to function by cross linking the epoxy resin through esterification at either the terminal 1,2-epoxy groups or at a hydroxyl group or both. The curing process usually requires heating the mixture of epoxy resin and the polycarboxylic acid anhydride at elevated temperatures and for extended times. It is known that the curing process can be expedited somewhat by the use of amine catalysts, but such means, although effective in accelerating the cure, introduces various difficulties and shortcomings of which the following are typical of the general class but not necessarily common to all. (1) The amines are extremely fast acting catalysts for epoxies and are further characterized by relatively high exotherms. Thus, the pot life of the resin mixture is short and castings produced therefrom often are marred by cracks, bubbles, striations and other imperfections. (2) The finished product has a high color attributable to the reaction of the amine with the epoxy and/or anhydride. (3) Amines, in general, are relatively toxic causing reactions in sensitive individuals. (4) Amines often have unpleasant odors leading to complaints from the technicians working in the area.

It is, therefore, a principal object of the present invention to provide an improved epoxy resin curing composition and process for preparing it.

A further object is to provide self-catalyzing epoxy resin compositions which on being cured do not appreciably darken in color.

A still further object is to provide epoxy resin compositions characterized by a relatively long pot life.

Another object of the invention is to provide a process for curing epoxy resins by copolymerization with dicarboxylix acid anhydrides using amine type accelerators wherein darkening of the composition on curing is minimized.

These and other objects are accomplished by my invention which provides epoxy resin curing agents comprising a solution of a minor proportion of an organic monoamine salt of a polycarboxylic acid in an excess of a polycarboxylic acid anhydride polymerizable with the epoxy resin, it provides curable mixtures of epoxy resins with the said curing agents and process for preparing the said compositions. In a preferred embodiment of my invention, a solution of an organic amine salt of a polycarboxylic acid is formed in situ in an excess of a polycarboxylic acid anhydride by the addition to said anhydride of a small proportion of water and a quantity of an organic amine not in excess of the stoichiometric equivalent of the water added. The water and amine may be added to the anhydride alone or after admixing with the epoxy resin to be cured. If added to the anhydride, the resulting curing agent may be stored until ready for use in curing an epoxy resin, or it may be mixed immediately with epoxy resin and cured in conventional manner.

I have found, in accordance with my invention, that the amine salts of polycarboxylic acids are capable of functioning as accelerators for the copolymerization of epoxy resins with polycarboxylic acid anhyrides, and have the advantages over the free amines heretofore employed, that slower reaction occurs at normal room temperatures thus providing longer pot life for the resin mix, and that upon heating to curing temperatures, satisfactorily rapid cures are effected without evolution of excessive amounts of heat, and resin compositions of substantially lighter colors are obtained than result from use of the free amine as cure accelerator. Because of the low reactivity at normal room temperatures of the catalyzed resin mixture, compositions containing all the ingredients necessary for cured resin formation including the cure accelerator, can be prepared well in advance of the curing operation. Such compositions can be styled "self catalyzing" since they do not require the incorporation of catalyst as a separate step immediately prior to cure as do compositions in which free amine catalysts are used. Alternatively, the amine salt of the dicarboxylic acid can be dissolved in the dicarboxylic acid anhyride curing agent and stored indefinitely in this form until blended with the solid or liquid epoxy resin for fabrication into the finished thermoset product.

In preparing the compositions of my invention, I can mix the epoxy resin, the dicarboxylic acid anhydride curing agent and the amine salt of the polycarboxylic acid in any desired manner. The amine salt may be a salt of the dicarboxylic acid corresponding to the anhydride used as the curing agent, or it may be the salt of a different dicarboxylic acid. Preferably, the salt is that corresponding to the anhydride used as curing agent since this permits formation of the amine salt in situ either in the epoxy resin/dicarboxylic acid anhydride mixture or in the anhydride alone, simply by adding water and amine to one of the above compositions.

I prefer, however, to first prepare the amine salt as a solution in the dicarboxylic acid anhydride and then to mix the epoxy resin and the amine-salt-containing anhydride prior to cure. This amine salt solution is prepared by adding a relatively small amount of water and amine to an excess of the anhydride and agitating the mixture until the mass becomes homogeneous, heating, if necessary, to assist the reaction and solution of the amine salt in the anhydride, especially if the anhydride is a solid at normal room temperatures (ca. 20–25° C.). Solvents may be used if desired to produce a fluid reaction mixture, but such expedient is usually unnecessary. Addition of water to the polycarboxylic acid anhydride curing agent converts to dicarboxylic acid, an amount of anhydride substantially stoichiometrically equivalent to the water added. Upon addition of amine, it reacts with the thus formed dicarboxylic acid to form the amine salt. The resulting mixture of polycarboxylic acid anhydride and amine salt of the corresponding polycarboxylic acid can be stored until needed for the curing operation and can then be added to the epoxy resin, whereupon curing is carried out in conventional manner, for example, by placing the composition in the desired mold, activating the mixture by increasing temperature to 80°–100° C. and post curing at e.g. 150° C.

In the alternative procedure, the composition is prepared by mixing epoxy resin, polycarboxylic acid anhydride and amine in the desired resin formulation proportions, and adding a small amount of water, which converts an equivalent quantity of anhydride to acid which in turn combines with amine to form the amine salt of the polycarboxylic acid. When the composition is formed in this manner, care should be taken to add water promptly to the mixture so as to avoid prolonged contact of the free amine with the resin forming components which tends to result in premature cure and in degradation of final resin color. Or, if desired, epoxy resin and polycarboxylic acid anhydride may be blended, then water added and finally amine to effect the same result without danger of premature cure.

In all of the alternative procedures the amount of water added will be sufficient to convert the desired quantity of polycarboxylic acid anhydride to polycarboxylic acid in at least sufficient quantity to react with substantially all the amine added. In general, amounts between about 0.2 mol percent and about 45 mol percent of water, based on the anhydride, preferably between about 1 mol percent and about 10 mol percent are satisfactory.

The quantity of amine added can be stoichiometrically less than, or equal to the quantity of water added but preferably should not be substantially in excess of the water as this would result in the presence of free amine which would not only reduce the pot life of the resulting composition but would produce a cured resin of inferior color.

Use of less than the stoichiometric equivalent of amine to water leaves a small proportion of dicarboxylic acid in the mixture. This free acid does no harm in amounts up to about 20 times the stoichiometric equivalent of the amine and may serve a useful purpose in accelerating the polymerization of the epoxy resin and the polycarboxylic acid anhydride and aids in producing light colored resins.

The epoxy resins, which per se do not form a part of my invention but which are components of my novel compositions, include complex polymeric resinous glycidyl polyether derivatives of polyhydric alcohols including especialy glycidyl polyethers of polyhydric phenols. The latter may be obtained by combining polyhydric phenols with polyfunctional halohydrins, the resulting derivatives being devoid of functional groups other than oxirane and hydroxyl groups, having alternate aliphatic and aromatic residues joined through ether oxygens and bearing terminal 1,2-epoxy groups. The synthesis of such resins is well known in the art. Examples of halohydrins commonly used are epichlorohydrin and glycerol dichlorohydrin and examples of polyhydric phenols are resorcinol, catechol, hydroquinones, etc. and also the "bis phenols", especially 2,2-bis(4-hydroxyphenyl)propane, "Bisphenol A"; 1,1-bis(4-hydroxyphenyl)ethane; 1,1-bis(4-hydroxyphenyl)butane; 2,2-bis(4-hydroxyphenyl)butane, "Bisphenol B," etc.

The "Bisphenols" can be prepared by methods well understood in the art, for example, by reaction of phenol with ketones having up to 6 carbon atoms in each chain attached to the oxy group.

Polymeric products having desirable properties can be prepared in accordance with my invention by employing any of the conventionl epoxy resins. Thus I may employ the "bis-phenol"-epichlorohydrin resins, especially those having an epoxide equivalent of from about 150 to 4,000, corresponding to an hydroxyl equivalent of about 70 to 210. The epoxide equivalent weight refers to the grams of resin containing one gram equivalent of epoxide and thus to epoxide equivalent or epoxy-plus-hydroxyl equivalent weight of such complex epoxide resin can be related to the value of "$n$" in the formula below which is believed to represent the general structure of the product of reaction of a polyhydric phenol and epichlorohydrin:

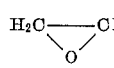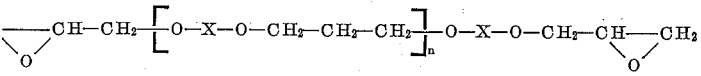

wherein X represents the residue of a polyhydric phenol devoid of functional groups and $n$ is a number from 0 to about 7.

Epoxy resins of the above type are available commercially under the trade names "Epon" resins, "Araldite" Epoxy resins, "Epi Rez" resins, etc. "Epon 828" used in the examples herein is a normally liquid glycidyl polyether of bisphenol A, having an average molecular weight of 350–400, viscosity at 25° C. of 5,000–15,000 centipoises, and epoxide equivalent of 175–210.

Epoxy resins useful in my invention also are prepared from epihalohydrins and polyhydric alcohols and thus include polyglycidyl ethers of ethylene glycol, propylene glycol, dimethylene glycol, diethylene glycol, triethylene glycol, glycerol, dipropylene glycol, etc.

The epoxidized phenol-aldehyde condensation product series of resins available under the trade name "Novolac" resins of the general structure given below can also be used

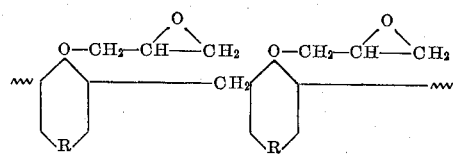

wherein R is hydrogen or an organic radical such as lower alkyl.

Also suitable for use in the compositions and process of my invention are the epoxy alicyclic esters such as those formed by a Diels-Alder reaction of butadiene and crotonaldehyde to form a cyclic unsaturated aldehyde, two mols of which are condensed by the Tischenko reaction to form an unsaturated condensate, which, when epoxidized, as with a peracid, yields the structure

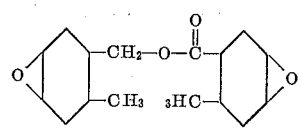

As used herein, the term "epoxide equivalent" is defined as that weight of the epoxy resin in grams which contains one gram chemical equivalent of epoxy (oxirane) group. This equivalent weight can be determined by titrating a weighed sample of the epoxy compound with an excess of pyridine hydrochloride (prepared by adding 16 cc. of concentrated hydrochloric acid to one liter of pyridine) at the boiling point for twenty minutes and backtitrating the excess of pyridine hydrochloride with 0.1 N sodium hydroxide using phenolphthalein as indicator. One HCl is considered to be the equivalent of one epoxy group.

"Epoxy Values" is a conventional term and represents the number of epoxy groups present in 100 grams of epoxy resin. 100 divided by the epoxy equivalent gives the epoxy value, thus a resin having an epoxy equivalent of 200 has an epoxy value of 0.50.

The polycarboxylic acid anhydrides useful as curing agents in the resin compositions of this invention contain one or more anhydride groups and may be of the aliphatic or aromatic series. Saturated and unsaturated anhydrides are contemplated also, and mixtures of one or more polycarboxylic acid anhydrides may be used.

Exemplary of suitable polycarboxylic acid anhydrides are the following:

maleic acid anhydride
succinic acid anhydride
adipic acid anhydride
sebacic acid anhydride
glutaric acid anhydride
phthalic acid anhydride
hexahydrophthalic acid anhydride
tetrahydrophthalic acid anhydride
naphthalene dicarboxylic acid anhydrides
dodecenyl succinic anhydride The acid anhydrides produced by the diene synthesis can also be used, such as those produced by the reaction of maleic acid anhydride with eleostearic acid-glyceride, or with unsaturated hydrocarbons of the terpene series such as limonene and terpinene.

Of particular value are the anhydrides

Endo-cis-bicyclo-(2,2,1)-5-heptene-2,3-dicarboxylic acid anhydride
Methyl-5-norbornene-2,3-dicarboxylic acid anhydride (methylendic anhydride) (methyl endomethylene tetrahydrophthalic anhydride)
1,4,5,6,7,-hexachloro-bicyclos-(2,2,1)-5-heptene-2,3-dicarboxylic acid anhydride ("Chlorendic" anhydride)

Especially preferred in my compositions are the polycarboxylic acids which are liquids at normal room temperatures or slightly above, for example, up to about 50° C., including methylendic anhydride, M.P. ca. 12° C., hexahydrophthalic anhydride M.P. 35–36° C., dodecenyl succinic anhydride, M.P. 12° C., etc.

These anhydrides, when used as curing agents for epoxy resins have the advantages of easy blending with both liquid and solid epoxy resins at low temperatures to give low viscosity resins at low temperatures, they impart longer pot life to the resin mixtures at normal room temperatures, they give low-peak exotherms, and finally produce exceptionally clear, tough resins having high heat distortion temperatures and having low weight loss at elevated temperatures. Of the liquid anhydrides the methylendic anhydride prepared by the Diels-Alder condensation of methyl cyclopentadiene and maleic anhydride is preferred. This compound has the structure shown below, and is sold under the trademark "Nadic."

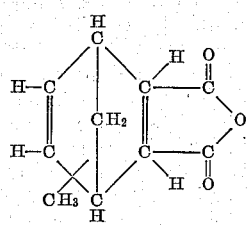

wherein the methyl group replaces one of the hydrogens shown in the formula.

This type of compound is hereinafter referred to as a "methylendic" type compound.

The proportion of anhydride curing agent to epoxy resin may vary widely as well known in the art. In general, ratios of anhydride to epoxy resin between about 0.5 and about 1.2 anhydride equivalent to one epoxide equivalent are suitable. By anhydride equivalent is meant the weight of the polycarboxylic acid anhydride per anhydride group. By epoxide equivalent is meant the weight of the epoxy resin per epoxy group, e.g. the weight of the epoxy resin in grams which contains one gram equivalent of epoxy group.

The amine salts which form the curing catalyst in my compositions are the acid amine salts of the polycarboxylic acids used, i.e. salts having the general formula

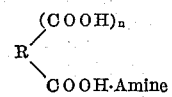

wherein R is the organic residue of a polycarboxylic acid and $n$ is a whole number, at least one, preferably from 1–3.

The amines employed in the prepartion of the amine salt curing catalysts of my compositions are, in general, of the type commonly used per se as curing catalysts in the art. They are mono- or polyfunctional organic aliphatic, cycloaliphatic or aromatic amines, including those listed below as examples:

methylamine
dimethylamine
hexylamine
ethanolamine
hexamethylenediamine
morpholine
benzyldimethylamine
benzylamine
chloroaniline
piperidine
piperazine
diethylene triamine
triethylenetetramine
m-phenylenediamine
dimethylaminopropylamine Any of the above amines or their equivalents or mixtures thereof may be reacted with one or more of the dicarboxylic acids from the anhydrides as above defined, to produce the curing catalyst of the invention.

The amount of amine salt used will be a catalytic amount sufficient to accelerate the reaction to the extent desired, and will depend on the particular amine used, its activity, the extent of acceleration desired, etc. Thus, the amount of amine salt present in the anhydride can be as low as a fraction of a mol percent of the anhydride, for example, .2 mol percent or less, up to the stoichiometric equivalent of the water added, i.e. up to about 45 mol percent. Usually proportions of amine salt between about 1 mol percent and about 10 mol percent of the anhydride are preferred.

The following specific examples further illustrate my invention. Parts and percentages are by weight and temperatures are given in degrees centigrade.

*Example 1*

A mixture consisting of 200 grams (1.12 mols) of methylendic anhydride (molecular weight 178), 0.54 gram of water (0.031 mol) and 4 grams (.030 mol) of benzyldimethylamine (molecular weight 135) was agitated at about 25° C. for 1 hour, thus converting about 0.31 mol of the methylendic anhydride to the dicarboxylic acid, methylendic acid, this amount being slightly more than theoretically required to react with all the amine present, to form the mono-amine salt. The resulting clear solution, which thus contained a quantity of about .030 mol or about 10.06 grams of methylendic acid-benzyldimethylamine salt (molecular weight 332) dissolved in the excess methylendic anhydride, was mixed with 241 grams of "Epon 828" resin having an epoxy value of 0.54, and the mixture was poured into a mold. This mixture, containing no free amine, had a pot life at normal room temperatures (ca. 20–25° C.) of several hours, whereas a similar mixture with a similar amount of free amine would gel in less than an hour. The mixture was pre-cured at 80° for 4 hours and was then post cured at 150° C. for 18 hours, thus producing a hard, tough, insoluble, infusible cast resin composition which was light tan in color having a heat distortion temperature (HDT) of 150° C. A similar resin cured with methylendic anhydride and the same amount of a free amine had a color considerably darker than the resin of the example and a heat distortion temperature of about 130° C.

*Example 2*

A mixture consisting of 200 grams (1.12 mols) of methylendic, 5.4 grams of water (0.31 mol) and 2.0 parts (.015 mol) of benzyldimethylamine, was agitated and heated at 50° for 1 hour, thus first converting 0.31 mol of methylendic anhydride to the corresponding dicarboxylic acid then forming about 0.15 mol, i.e. 4.98 grams, of the mono benzyldimethylamine salt of methylendic acid, and leaving about 0.295 mol of methylendic dicarboxylic acid, all in solution in the excess methylendic anhydride. The resulting clear liquid was cooled to 25° and 241 parts of "Epon 828" resin (epoxy value 0.54) were admixed with the anhydride-amine salt solution. The resulting liquid resin was poured into a mold and cured as described in Example I. The resulting cast resin was a composition similar in properties to that of Example 1, but had a somewhat lighter color indicating that the presence of some free dicarboxylic acid does no harm and causes at least a slight lightening of color of the resulting cast resin.

*Example 3*

In order to compare color and heat distortion properties of resins prepared in a manner similar to that of Examples 1 and 2, except that free amine instead of amine salt was used, resin mixtures were prepared using known techniques and various orders of mixing the following components 100 parts of Epon 828
83 parts of methylendic anhydride
1 part of benzyldimethylamine The curing schedule was as described in Example 1 above, and the resulting cast compositions had the heat distortion values shown below.

Order of mixing:                   HDT[1] °
  A. Anhydride+epoxy, add catalyst _____ 138
  B. Anhydride+catalyst, add epoxy _____ 124
  C. Epoxy+catalyst, add anhydride _____ 122

[1] ASTM Method D–648–45T.

Each of the three castings was quite dark in color, being considerably darker than the castings obtained in Examples 1 and 2 above, although in Example 1, a larger proportion of amine based on epoxy resin (i.e. 1.66 times as much) was used which would be expected to result in a darker color.

*Example 4*

To a mixture of 50 grams of Epon 828 and 40 grams (.244 mol) of methylendic anhydride, ½ part (.0037 mol) of benzyldimethylamine was added. To 40 grams of the resultant mixture (44.2% of total or .0990 mol methylendic anhydride), 0.178 part of water (.0099 mol) was added and the mass agitated at ambient temperature until homogeneous, thus producing .0016 mol (about 0.44 gram) of the mono-benzyldimethylamine salt of methylendic acid and a small amount (about .0083 mol) of methylendic acid.

Castings were prepared from both portions of the resin compositions, the first containing free amine, the second containing amine salt of methylendic acid, and no free amine, following the same curing schedule as indicated in Example 1 above. The resultant castings were quite different in color, the resin catalyzed by the free amine (i.e. the initial portion to which no water had been added) was brownish-yellow or dark amber while the resin catalyzed by the amine salt of methylendic dicarboxylic acid (i.e. the portion to which water was adde) was light yellow.

*Example 5*

A mixture of 40 grams of methylendic anhydride, (.244 mol) and ½ part of benzyldimethylamine (.0037 mol), was prepared, and to it were added 50 grams of Epon 828 resin. To 40 parts of the resultant mass, 0.178 part of water (.0099 mol) was added, and the mass was agitated at ambient temperature until homogeneous, thus forming about .0016 mol (0.44 gram) of benzyldimethylamine salt of methylendic anhydride in the mixture.

Castings were prepared from both resin masses under nitrogen, following the curing schedule of Example 1 above, and resulted in finished castings which were quite different in color. The casting derived from the resin catalyzed by the free amine was almost black in color while the casting made from the resin catalyzed by the amine salt (i.e. the second portion to which water had been added) was light yellow.

The effect on gel time (and hence pot life) of the amine salts was indicated by the following test:

Equal portions of the two resin masses prepared above were heated in an oil bath until gelation had occurred.

The mass catalyzed by the free amine gelled in about 1 hour at 90±5°. The amine salt-catalyzed mass had not gelled at 90° after 1 hour and was heated to 145°±5°. The mass gelled after 25 minutes at that temperature.

*Example 6*

To show the effect of amine salt, in the absence and presence of small amounts of free dicarboxylic acid, on the color of the cured resin, a series of compositions in which the amount of water added was the only variable, was prepared and cured as described below:

Four mixtures were prepared in which 100 grams of methylendic anhydride (.559 mol) and 2 grams (.0148 mol) of benzyldimethylamine were heated, with no water and with different amounts of water at 50° for 1 hour and thereafter cooled to 25° C., to convert corresponding amounts of methylendic anhydride to the dicarboxylic acid. In the first test (A), the mixture received no water; in (B) the mixture was treated with an amount of water stoichiometrically equivalent to the amine used; in (C) water in an amount of about twice the stoichiometric equivalent of the amine was added, and in (D) water in an amount more than three times the stoichiometric equivalent of the amine was added, thus in all cases forming about .0148 mol of amine salt and in tests B, C and D leaving in the mixture small amounts of dicarboxylic acid. To 100 parts of Epon 828 resin, 82 parts of the several amine salt solutions were added and the mixture cured at 80° for 4 hours and then at 150° for 20 hours. The color of the amine solution and cured resin is given in the following table:

TABLE I

| | Water Used | | Dicarboxylic Acid, Mols | Color of Amine Salt Solution | Color of Cured Resin |
|---|---|---|---|---|---|
| | Grams | Mols | | | |
| A | 0.0 | 0.0 | 0.0 | Black | Black. |
| B | 0.27 | .015 | 0.003 | Yellow[1] | Yellow. |
| C | 0.50 | .0278 | .013 | ____do[1] | Lighter than B. |
| D | 1.00 | .0555 | .0407 | ____do[1] | Lighter than C. |

[1] Slightly darker color than original anhydride.

The curing process of my invention is thus particularly valuable in producing finished resins of unusually light color and high heat distortion temperature. When used with endo-cis-5-norbornene-2,3-dicarboxylic anhydride and methylendic anhydride curing agents, my new process sharply enhances the inherently superior color and temperature properties of resins cured with these anhydrides.

The practical advantage of adding the amine-salt accelerator to the curing agent, as in the preferred process of preparing the resin compositions of the invention, permits the resin fabricator to avoid the necessity for the last minute addition of small quantities of accelerators, such as free amines, to a large batch of liquid resin and to avoid the difficulty of rapidly blending such small amounts uniformly throughout the batch in time to prevent premature curing and discoloration.

As is common practice in this art, various auxiliary materials may be incorporated in my resin compositions such as reinforcing agents, inert powders and fillers, pigments, auxiliary catalyst extenders, solvents, compatible resins and the like. The formulation and curing of these resin compositions are described in the various patents and publications relating to this general field in the polymer art, and hence are considered to be now so well known that no extended discussion of these collateral aspects is believed necessary here.

While the above describes the preferred embodiments of my invention, it will be understood that departures may be made therefrom within the scope of the specification and claims.

I claim:

1. An improved curing agent for epoxy resins comprising a major proportion of a polycarboxylic acid anhydride having dissolved therein a minor proportion of a mono-amine salt of a polycarboxylic acid.

2. An improved curing agent for epoxy resins comprising a major proportion of a polycarboxylic acid anhydride having dissolved therein a minor proportion of a mono-amine salt of the polycarboxylic acid corresponding to said polycarboxylic acid anhydride.

3. The composition according to claim 2 wherein the polycarboxylic acid anhydride is methyl-5-norbornene-2,3-dicarboxylic acid anhydride.

4. An improved curing agent for epoxy resins comprising a major proportion of a polycarboxylic acid anhydride and minor proportions dissolved therein, of the polycarboxylic acid corresponding to said polycarboxylic acid anhydride and of a mono-amine salt of said polycarboxylic acid.

5. The process for producing an improved epoxy resin curing agent which comprises adding to a polycarboxylic acid anhydride a quantity of water equivalent to between about .2 mol percent and about 45 mol percent based on the anhydride, and a quantity of an organic amine not greater than the stoichiometric equivalent of the water added, and agitating the mixture at a temperature sufficiently high to produce a solution of the resulting mono-amine salt of the polycarboxylic acid in the excess polycarboxylic acid anhydride.

6. A heat curable, self-catalyzing resin composition comprising (1) an epoxy resin selected from the group consisting of glycidyl polyethers of polyhydric phenols, glycidyl polyethers of polyhydric alcohols, glycidyl polyethers from phenol-aldehyde condensation products and epoxy alicyclic esters, (2) a polycarboxylic acid anhydride polymerizable with said epoxy resin and (3) a catalytic amount of an organic mono-amine salt of a polycarboxylic acid.

7. A heat curable, self-catalyzing resin composition comprising (1) a glycidyl polyether of a polyhydric phenol (2) methyl-5-norbornene-2,3-dicarboxylic acid anhydride and a catalytic quantity of an organic mono-amine salt of methyl-5-norbornene-2,3-dicarboxylic acid.

8. The process for preparing a self-catalyzing epoxy resin composition which comprises adding to a polycarboxylic acid anhydride a quantity of water equivalent to between about .2 mol percent and about 45 mol percent based on the anhydride, adding an organic amine to said mixture in an amount not greater than the stoichiometric equivalent of the water added, agitating the mixture at a temperature sufficiently high to produce a solution of the resulting mono-amine salt of the polycarboxylic acid in the polycarboxylic acid anhydride, and mixing the resulting solution with an epoxy resin in the ratio of between about 0.5 and about 1.2 anhydride equivalent and one epoxide equivalent.

9. The process according to claim 8 wherein the polycarboxylic acid anhydride is methyl-5-norbornene-2,3-dicarboxylic acid anhydride.

References Cited by the Examiner

UNITED STATES PATENTS 2,949,441  8/1960  Newey _____ 260—47
2,955,101  10/1960 Bruin et al. _____ 260—47

WILLIAM H. SHORT, Primary Examiner.

HAROLD BURSTEIN, Examiner.

P. H. HELLER, Assistant Examiner.